(12) United States Patent
Battle et al.

(10) Patent No.: US 11,868,773 B2
(45) Date of Patent: Jan. 9, 2024

(54) INFERRING FUTURE VALUE FOR SPECULATIVE BRANCH RESOLUTION IN A MICROPROCESSOR

(71) Applicant: International Business Machines Corporation, Armonk, NY (US)

(72) Inventors: Steven J. Battle, Philadelphia, PA (US); Brian D. Barrick, Pflugerville, TX (US); Dung Q. Nguyen, Austin, TX (US); Richard J. Eickemeyer, Rochester, MN (US); John B. Griswell, Jr., Austin, TX (US); Balaram Sinharoy, Lagrangeville, NY (US); Brian W. Thompto, Austin, TX (US); Tu-An T. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 17/569,951

(22) Filed: Jan. 6, 2022

(65) Prior Publication Data

US 2023/0214218 A1 Jul. 6, 2023

(51) Int. Cl.
*G06F 9/30* (2018.01)
*G06F 9/38* (2018.01)

(52) U.S. Cl.
CPC ...... *G06F 9/30058* (2013.01); *G06F 9/30021* (2013.01); *G06F 9/30043* (2013.01); *G06F 9/3842* (2013.01); *G06F 9/3856* (2023.08)

(58) Field of Classification Search
CPC ............. G06F 9/30058; G06F 9/30043; G06F 9/3842; G06F 9/30101; G06F 9/3844;
(Continued)

(56) References Cited

U.S. PATENT DOCUMENTS 7,234,046 B2 6/2007 Su
8,521,996 B2 8/2013 Henry et al.
(Continued)

OTHER PUBLICATIONS

D'Antras et al.; "Optimizing Indirect Branches In Dynamic Binary Translators", ACM Transactions on Archit. And Code Optim., Apr. 2016, pp. 1-25, vol. 13, No. 1, Article 7.
(Continued)

*Primary Examiner* — Jyoti Mehta
*Assistant Examiner* — Kasim Alli
(74) *Attorney, Agent, or Firm* — Scully, Scott, Murphy & Presser, P.C.

(57) ABSTRACT

A system, processor, programming product and/or method including: an instruction dispatch unit configured to dispatch instructions of a compare immediate-conditional branch instruction sequence; and a compare register having at least one entry to hold information in a plurality of fields. Operations include: writing information from a first instruction of the compare immediate-conditional branch instruction sequence into one or more of the plurality of fields in an entry in the compare register; writing an immediate field and the ITAG of a compare immediate instruction into the entry in the compare register; writing, in response to dispatching a conditional branch instruction, an inferred compare result value into the entry in the compare register; comparing a computed compare result value to the inferred compare result value stored in the entry in the compare register; and not execute the compare immediate instruction or the conditional branch instruction.

20 Claims, 8 Drawing Sheets

(58) Field of Classification Search
CPC .... G06F 9/3846; G06F 9/3848; G06F 9/3832; G06F 9/30021; G06F 9/3856
See application file for complete search history.

(56) References Cited

U.S. PATENT DOCUMENTS

| | | | |
|---|---|---|---|
| 10,379,860 | B2 | 8/2019 | Carlough et al. |
| 10,481,914 | B2 | 11/2019 | Bolbenes et al. |
| 10,831,476 | B2 | 11/2020 | Gainey, Jr. et al. |
| 10,901,743 | B2 | 1/2021 | Ward et al. |
| 2013/0283023 | A1* | 10/2013 | Tabony ............... G06F 9/30072 712/240 |
| 2014/0022972 | A1 | 1/2014 | Ahn et al. |
| 2014/0229721 | A1 | 8/2014 | Forsyth et al. |
| 2015/0268958 | A1 | 9/2015 | Al Sheikh et al. |
| 2016/0216966 | A1 | 7/2016 | Dice et al. |
| 2017/0109167 | A1* | 4/2017 | Eisen ................. G06F 12/0891 |
| 2019/0220284 | A1* | 7/2019 | Gupta ................. G06F 9/3806 |
| 2020/0026520 | A1* | 1/2020 | Ward .................... G06F 9/3804 |
| 2020/0210178 | A1 | 7/2020 | Chynoweth et al. |
| 2020/0356369 | A1* | 11/2020 | Battle ................. G06F 9/30141 |
| 2021/0004233 | A1 | 1/2021 | Kumar et al. |

OTHER PUBLICATIONS

Quinones et al.; "Improving Branch Prediction And Predicated Execution In Out-Of-Order Processors", HPCA IEEE 13th International Symposium On, Feb. 10-14, 2007, pp. 75-84.
Silc et al.; "Dynamic Branch Prediction And Control Speculation", International Journal Of High Performance Systems Architecture, Apr. 20, 2007, pp. 2-13, vol. 1, No. 1.
Lee et al.; "Inferring Fine-Grained Control Flow Inside SGX Enclaves With Branch Shadowing", 26th USENIX Security Symposium on, Aug. 16-18, 2017, pp. 1-19.
Chowdhuryy et al.; "BranchSpec: Information Leakage Attacks Exploiting Speculative Branch Instruction Executions", ICCD IEEE 38th Inter. Conf. On, Oct. 18-21, 2020, pp. 1-8.

* cited by examiner

INFERRING FUTURE VALUE FOR SPECULATIVE BRANCH RESOLUTION IN A MICROPROCESSOR

BACKGROUND OF INVENTION

The present invention generally relates to data processing systems, processors, and processor architecture, and methods of processing instructions in a system, processor and/or circuitry, and in an example embodiment processing a compare immediate-conditional branch instruction sequence.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware pipelines connected in parallel within a processor to process multiple instructions concurrently. Pipelining involves processing instructions in stages. Some processors may have multiple processor cores, and in some cases, each processor core can have multiple pipelines. Multiple execution slices or pipelines may be used as part of simultaneous multi-threading within a processor core.

The various pipelined stages may include an "instruction fetch" stage where an instruction is fetched from memory. In a "decode" stage, the instruction may be decoded into different control bits, which in general designate a type of functional unit (e.g., execution unit) for performing the operation specified by the instruction, and source operands for the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. The results are usually written to one or more register files. Register files typically hold data for and/or receive data from the execution units. Register files typically have information read from and/or written to entries or locations in the register file. In one or more embodiments, register files can be subdivided into blocks or banks such that execution units are assigned specific blocks or banks to which they write their results.

Branch instructions can be either unconditional, meaning that the branch is taken every time that the instruction is encountered in the program, or conditional, meaning that the branch is either taken or not taken, depending upon a condition. Processors typically process conditional branch instructions which permit a computer program to branch from one instruction to a target instruction (and skip intermediate instructions, if any) if the condition is satisfied. Most often, the instructions to be executed following a conditional branch instruction are not known with certainty until the condition upon which the branch depends has been resolved. The processing of these types of branches can significantly reduce the performance of pipeline processors since they may interrupt the steady supply of instructions to the execution hardware (e.g., the execution units). Processors can contain branch predictors that attempt to predict the outcome of conditional branch instructions in a program before the branch instruction is executed. If a branch instruction is mis-predicted, however, all of the speculative work (e.g., instructions) performed by the processor, beyond the point in the program where the branch was encountered, typically needs to be discarded.

Another problem with conditional branch instructions is processing of a Compare Immediate-Conditional Branch instruction sequence. Typically, when processing a Compare Immediate-Conditional Branch instruction sequence, the Compare (e.g., Compare Immediate) instruction typically waits for a load or add instruction to produce the result before the Compare instruction can be issued and executed. In addition, the Conditional Branch instruction will typically wait for the Compare instruction to execute and provide the branch prediction before the Branch can be issued and executed. Waiting for each instruction in the Compare-Conditional Branch instruction sequence to execute before executing the subsequent instruction can lead to delay and latency. It would be advantageous to process this conditional branch instruction sequence more expeditiously and in a manner that does not wait for each instruction to execute before executing the subsequent instruction, and yet executes the sequence in an efficient manner that does not require excessive flushing that will result in delay and latency.

SUMMARY

The summary of the disclosure is given to aid understanding of a computer system, computer architectural structure, processor, processor architecture structure, processor pipelines, functional units, register files, and method of processing instructions in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, processor architecture structure, processor pipeline, functional units, register files, and/or their method of operation to achieve different effects.

A computer system, processor, programming product, and/or method for processing instructions is disclosed that in an embodiment processes a conditional branch sequence, e.g., a Load-Compare Immediate-Conditional branch sequence, in a more efficient manner, and in an approach that does not wait for the Compare Immediate and/or Conditional Branch instruction to execute. In an embodiment, the system, processor, programming product, and/or method will infer the branch prediction from a Branch predictor. In one or more embodiments a system, processor, programming product and/or method for processing instructions is disclosed that includes: storing, in response to a load bit of a first instruction of a compare immediate-conditional branch instruction sequence being set, information from the first instruction into a compare register, including an ITAG of the first instruction; writing, in response to the load bit of the first instruction being set, an immediate field of a compare immediate instruction of the compare immediate-conditional branch instruction sequence into the compare register; writing, in response to detecting a conditional branch instruction of the compare immediate-conditional branch instruction sequence, an inferred compare result value into the compare register; and auto-finishing without executing the compare immediate and the conditional branch instructions from the compare immediate-conditional branch instruction sequence. In a further embodiment, the system processor, programming product and/or method includes: comparing, in response to executing the first instruction, a writeback ITAG of the first instruction to the ITAG of the first instruction stored in the compare register; writing, in response to the writeback ITAG of the first instruction matching the ITAG of the first instruction stored in the compare register, a first instruction writeback result into a data field in the compare register; comparing, in response to the first instruction writeback result being written into the data field in the compare register, the first instruction writeback result written into the data field in the compare register with the immediate field of the compare immediate instruction written into the compare register to generate a computed compare result value; comparing the computed compare result value to the inferred compare result value; flushing, in response to the computed compare result value not matching the inferred compare result value, instructions in the processor; and not flushing, in response to the computed compare result value matching the inferred compare result value, instructions in the processor.

In one or more aspects, the system, processor, programming product and/or method can further include writing information regarding the first instruction into a Mapper and an Issue Queue, and in a further aspect can include: reading, in response to detecting the compare immediate instruction of the compare immediate-conditional branch instruction sequence, information from the first instruction in the Mapper; and writing the information read from the first instruction in the Mapper into the compare register. The information from the first instruction written into the compare register can in an arrangement include the ITAG of the first instruction, the load bit of the first instruction, and the written bit of the first instruction. Information from the first instruction in an aspect is not written into the compare register if the first instruction has executed and written its result before the compare immediate instruction is dispatched to an Issue Queue. The first instruction in a further arrangement is at least one of a group consisting of a load instruction and an add instruction. In an aspect, the inferred compare result value is obtained from an entry in a control register.

The system, processor, programming product, and/or method can further include in an embodiment, deallocating the compare immediate instruction from an Issue Queue. In a further aspect, a compare immediate instruction ITAG and a conditional branch ITAG are sent to an Instruction Complete Table to be marked finished. In one or more approaches, the system, processor, programming product, and/or method can further include writing the compare immediate instruction ITAG into the compare register, and obtaining the compare immediate instruction ITAG sent to the Instruction Complete Table from the compare register. In a further aspect, the system, processor, programming product, and/or method can further include sending, in response to the first instruction issuing for execution, the first instruction writeback ITAG to the compare register. According to another arrangement, the system, processor, programming product, and/or method can further include updating, in response to the writeback result of the first instruction being available in the compare register, a control register mapper and an Issue Queue. The inferred compare result value in an embodiment is based at least in part on at least one of a group consisting of: a branch prediction determined by a branch predictor, a representation of a branch prediction determined by a branch predictor, and combinations thereof.

In an aspect, a method for processing instructions in a processor is described that includes: writing information from a first instruction of a compare immediate-conditional branch instruction sequence into an entry of a compare register; writing, in response to the first instruction not being executed before a compare immediate instruction of the compare immediate-conditional branch instruction sequence is dispatched, a compare immediate field of the compare immediate instruction into the entry of the compare register; writing, in response to dispatching a conditional branch instruction of the compare immediate-conditional branch instruction sequence, an inferred compare result value into the entry in the compare register; writing a writeback result of the first instruction into a data field in the entry in the compare register; comparing the writeback result of the first instruction written into the data field in the entry in the compare register to the immediate field of the compare immediate instruction written into the entry in the compare register to generate a computed compare result value; comparing the computed compare result value to the inferred compare result value stored in the entry in the compare register; and not executing the compare immediate instruction or the conditional branch instruction of the compare immediate-conditional branch instruction sequence. In a further aspect, the method includes flushing, in response to the computed compare result value not matching the inferred compare result value, instructions in the processor. In a further aspect the first instruction is a load instruction, and the method further includes: writing the information from the first instruction into a first entry in an Issue Queue; writing information from the compare immediate instruction into a second entry in the Issue Queue; and deallocating, in response to writing the inferred compare result value into the entry in the compare register, the second entry in the Issue Queue containing the information from the compare immediate instruction. The method according to an aspect further includes auto-finishing the compare immediate and the condition branch instruction of the compare immediate-conditional branch instruction sequence.

In a further aspect a processor is described that includes: an instruction dispatch unit configured to dispatch instructions of a compare immediate-conditional branch instruction sequence, the compare immediate-conditional branch instruction sequence comprising a first instruction, a compare immediate instruction, and a conditional branch instruction; a logical register mapper having a plurality of entries, each logical register mapper entry configured to map a logical register to a physical register entry in a physical register file; an issue queue to hold the instructions dispatched from the instruction dispatch unit; an execution unit to execute the instructions issued by the issue queue; and a compare register having at least one entry to hold information in a plurality of fields.

The foregoing and other objects, features, and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of a computer system, computer architectural structure, processor, processor architectural structure, processor pipelines, functional units, register files, and/or their method of operation, including processing of conditional branch instructions (e.g., Load-Compare Immediate-Conditional Branch sequence), will be better understood when read in conjunction with the figures provided. Embodiments are provided in the figures for the purpose of illustrating aspects, features, and/or various embodiments of the computer system, computer architectural structure, processor, processor architectural structure, processor pipelines, functional units, register files, and their method of operation, but the claims should not be limited to the precise system, embodiments, methods, processes and/or devices shown, and the features, and/or processes shown may be used singularly or in combination with other features, and/or processes. It may be noted that a numbered element is numbered according to the figure in which the element is introduced, is often, but not always, referred to by that number in succeeding figures, and like reference numbers in the figures often, but not always, represent like parts of the illustrative embodiments of the invention.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, processor architectural structure, processor execution pipelines, functional units, register files, and their method of operation, however, it will be understood by those skilled in the art that different and numerous embodiments of the computer system, computer architectural structure, processor, processor architectural structure, processor execution pipelines, functional units, and their method of operation may be practiced without those specific details, and the claims and invention should not be limited to the system, assemblies, subassemblies, architecture, embodiments, functional units, features, circuitry, instructions, programming, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including microprocessors, processors, processor architectures, processor execution pipelines, processor functional units, and register files which are apparent to those skilled in the art. It is assumed that those skilled in the art are familiar with the general architecture of processors, and, in particular, with processors having execution pipelines where each execution pipeline has one or more functional units including one or more execution units, and instructions are executed out of order.

Figure 1:
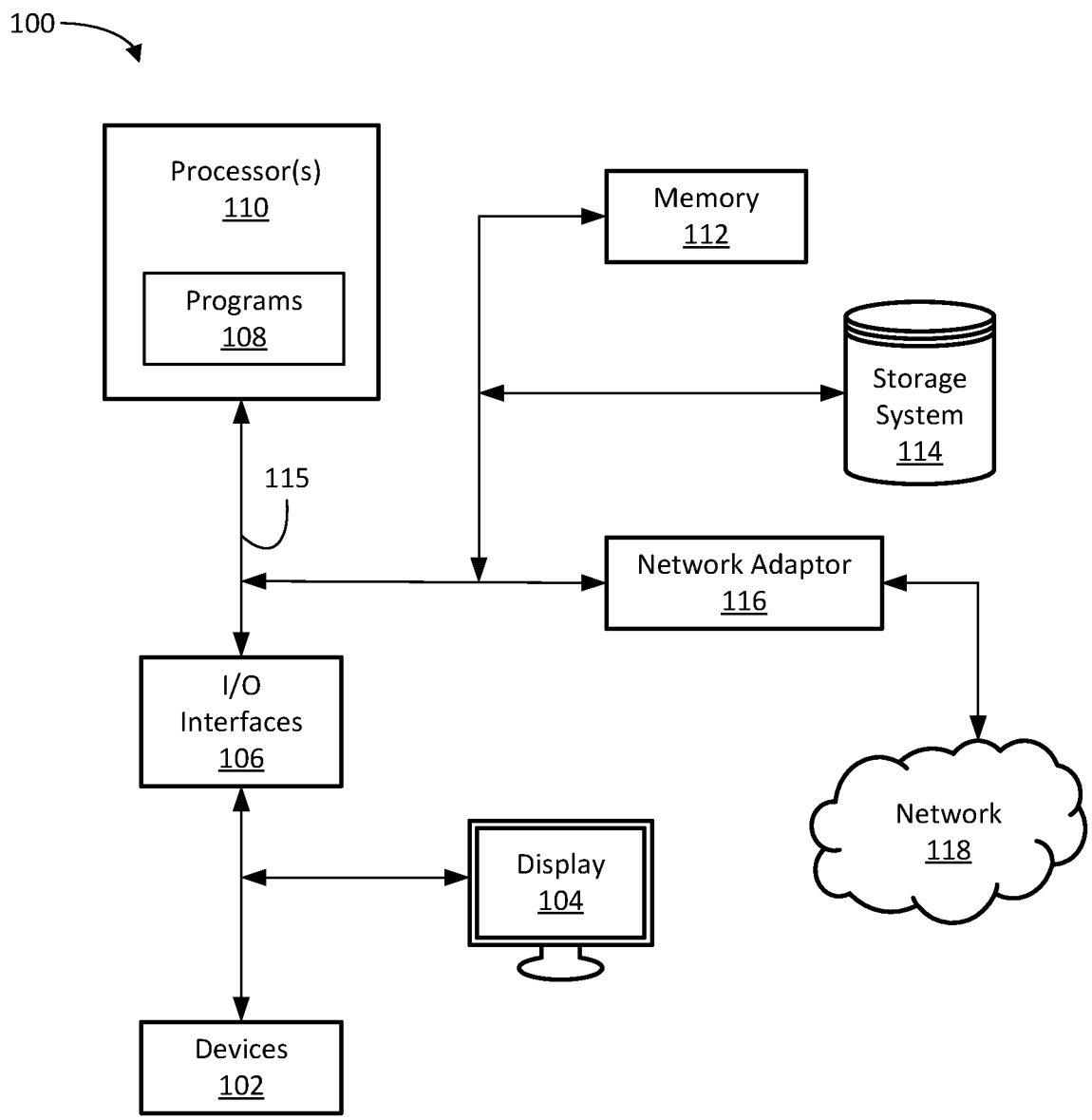
FIG. 1 illustrates an example of a data processing system in which aspects of the present disclosure may be practiced.

FIG. 1 illustrates an example computing and/or data processing system 100 in which aspects of the present disclosure may be practiced. It is to be understood that the computer and/or data processing system 100 depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 1 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, and/or programmable consumer electronics, that include any of the above systems or devices, and the like.

In some embodiments, the computer system 100 may be described in the general context of computer system executable instructions, embodied as program modules stored in memory 112, being executed by the computer system. Generally, program modules may include routines, programs, objects, components, logic, data structures, and so on that perform particular tasks and/or implement particular input data and/or data types in accordance with the present invention.

The components of the computer system 100 may include, but are not limited to, one or more processors or processing units 110, a memory 112, and a bus 115 that operably couples various system components, including memory 112 to processor 110. In some embodiments, the processor 110, which is also referred to as a central processing unit (CPU) or microprocessor, may execute one or more programs or modules 108 that are loaded from memory 112, where the program module(s) embody software (program instructions) that cause the processor to perform one or more operations. In some embodiments, module 108 may be programmed into the integrated circuits of the processor 110, loaded from memory 112, storage device 114, network 118 and/or combinations thereof.

The processor (or CPU) 110 can include various functional units, registers, buffers, execution units, caches, memories, and other units formed by integrated circuitry, and may operate according to reduced instruction set computing ("RISC") techniques. The processor 110 processes data according to processor cycles, synchronized, in some aspects, to an internal clock (not shown). Bus 115 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system may include a variety of computer system readable media, including non-transitory readable media. Such media may be any available media that is accessible by the computer system, and it may include both volatile and non-volatile media, removable and non-removable media.

Memory 112 (sometimes referred to as system memory) can include computer readable media in the form of volatile memory, such as random-access memory (RAM), cache memory and/or other forms. Computer system may further include other removable/non-removable, volatile/non-volatile computer system storage media. By way of example only, storage system 114 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces.

The computer system may also communicate with one or more external devices 102 such as a keyboard, track ball, mouse, microphone, speaker, a pointing device, a display 104, etc.; one or more devices that enable a user to interact with the computer system; and/or any devices (e.g., network card, modem, etc.) that enable the computer system to communicate with one or more other computing devices. Such communication can occur via Input/Output (I/O) interfaces 106. Communications adapter 116 interconnects bus 115 with an outside network 118 enabling the data processing system 100 to communicate with other such systems. Additionally, an operating system such as, for example, AIX ("AIX" is a trademark of the IBM Corporation) is used to coordinate the functions of the various components shown in FIG. 1.

The computer system 100 can communicate with one or more networks 118 such as a local area network (LAN), a general wide area network (WAN), and/or a public network (e.g., the Internet) via network adapter 116. As depicted, network adapter 118 communicates with the other components of computer system via bus 115. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 2:
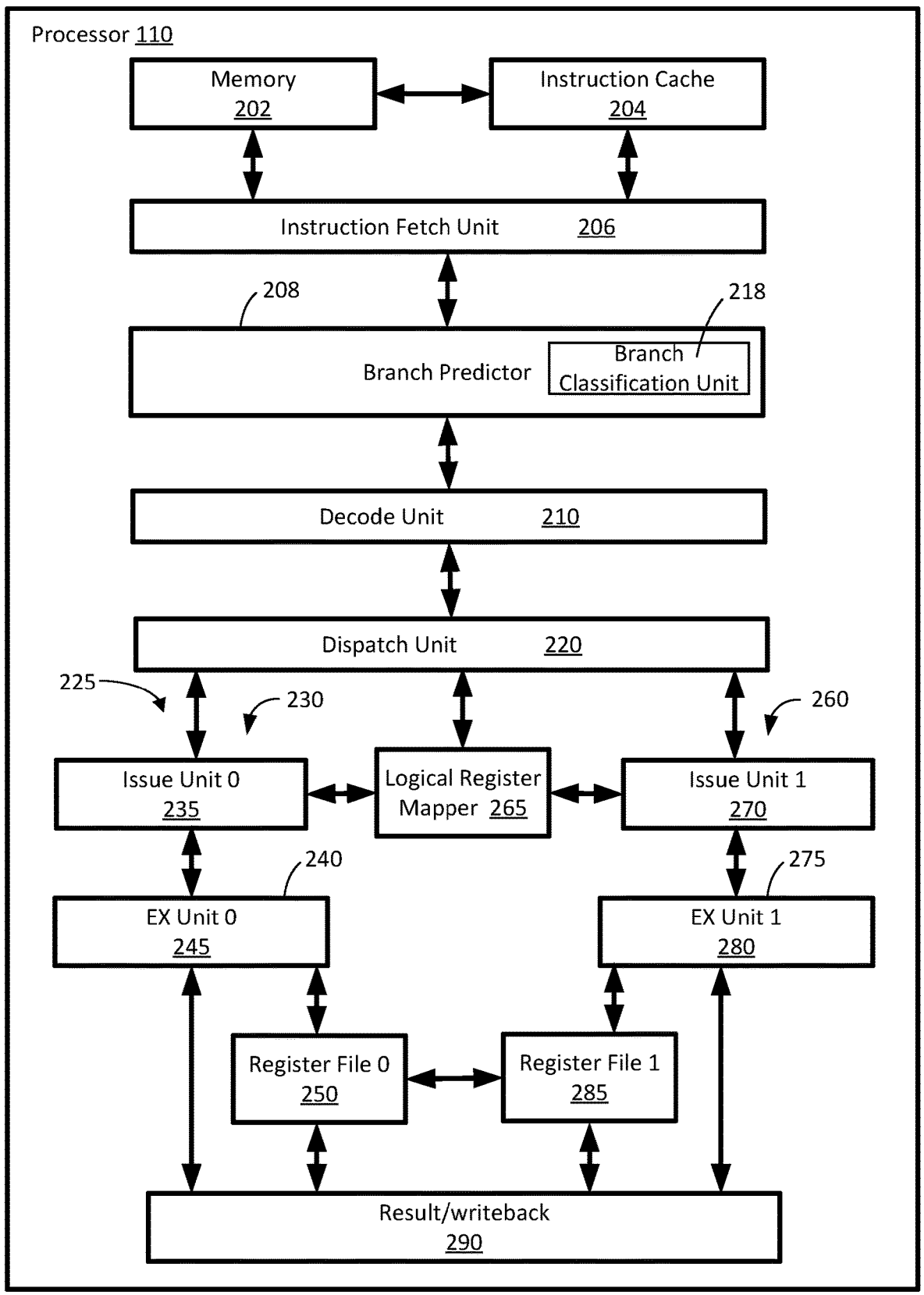
FIG. 2 illustrates a block diagram of a processor in which certain aspects of the present disclosure may be practiced.

FIG. 2 depicts a simplified block diagram of a processor 110 according to an embodiment. The processor 110 includes memory 202, instruction cache 204, instruction fetch unit 206, branch predictor 208, branch classification unit 218, decode unit 210, dispatch unit 220, an execution slice 225 that includes LSU processing pipeline 230 and VSU processing pipeline 260, and destination resource (Result/writeback) 290. The processor 110 may be included within a computer system or otherwise distributed within a computer system, e.g., computer system 100. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of instruction fetch unit 206, branch predictor 208, decode unit 210, dispatch unit 220, and execution slice 225 are depicted. In various embodiments, the processor 110 may include multiple processing execution slices 225, e.g., four execution slices 225. In an embodiment, each execution slice 225 includes processing pipeline 0 (230) and processing pipeline 1 (260). In an aspect, processing pipeline 0 (230) includes issue unit 0 (235), execution unit 0 (240), and physical register file 0 (250). Execution unit 240 in an embodiment includes one or more execution units 245, for example, a load-store unit (LSU), a vector-scalar unit (VSU), store/simple/branch (SX) unit, etc. Processing pipeline 0 (230) may also include other features, such as error checking and handling logic, one or more parallel paths through processing pipeline 0 (230), and other features now or hereafter known in the art. In an aspect, processing pipeline 1 (255) includes issue unit 1 (270), execution unit 1 (275), and physical register file 1 (285). Execution unit 275 in an embodiment includes one or more execution units 280, for example, a vector-scalar unit (VSU), a Fixed point (FX) unit, an Arithmetic Logic Unit (ALU), etc. Processing pipeline 1 260 may also include other features, such as error checking and handling logic, one or more parallel paths through processing pipeline 1 (260), and other features now or hereafter known in the art. Processor pipeline 225 also has a logical register mapper 265 which maps logical (architectural) register file entries to physical register file entries in register files 250, 285. That is, in the example embodiment of FIG. 2, processing pipeline 0 (230) and processing pipeline 1 (260) share logical register mapper 255. Not shown in FIG. 2 is a history buffer (HD), e.g., a save-restore buffer (SRB), to hold instructions and metadata on instructions evicted from the logical register mapper 265. Also not shown in FIG. 2 are control registers, control register mappers, and control register history buffers (e.g., control register save-and-restore (SRB) buffers).

In the processor 110 of FIG. 2, the instruction fetch unit 206 fetches instructions from the instruction cache 204 according to an instruction address, for further processing by the decode unit 210. The decode unit 210 decodes instructions and passes the decoded instructions, portions of instructions, or other decoded data to the dispatch unit 220. The decode unit 210 may also detect branch instructions not detected and/or predicted by branch predictor 208. More specifically as an overview, in the example of FIG. 2, the decode unit 210 will transmit the decoded instruction to the dispatch unit 220 which will dispatch the decoded instruction to either Issue Unit 0 (235) or Issue unit 1 (270). The respective issue units 235, 270 analyze the instructions or other data and transmits the decoded instructions, portions of instructions, or other data to execution units 240, 275 in the respective pipelines 230, 255 based on the analysis. The respective physical register file 250, 285 holds data for the respective execution units 240, 275. Physical register files 250, 285 can be separate register files where data in one register file can be used by either execution unit 240, 275, and in an embodiment register files 250, 285 can be a single register file. While a forward path through the processor 110 is depicted in FIG. 2, other feedback and signaling paths may be included between elements of the processor 110.

Processor 110 also includes result/write back logic 290 to write the results of executed instructions, e.g., results from processing pipeline 230 and processing pipeline 260, to a destination resource. The destination resource may be any type of resource, including registers, cache memory, other memory, I/O circuitry to communicate with other devices, other processing circuits, or any other type of destination for executed instructions or data. Register files 250, 285 have read ports for reading data residing in entries in the register files 250, 285, and write ports to write data to entries in the register files 250, 285. In an embodiment, the results are written back to certain blocks, e.g., STF blocks, of entries in the register files 250, 285. The processor 110 may include other circuits, functional units, and components.

Instructions may be processed in the processor 110 of FIG. 2 in a sequence of logical, pipelined stages. However, it should be understood that the functions of these stages and functional units may be merged together so that the particular division of stages in FIG. 2 should not be taken as a limitation, unless such a limitation is clearly indicated in the claims herein. Indeed, some of the stages or functional units are indicated as a single logic/functional unit in FIG. 2 for the sake of simplicity of understanding, and further detail as relevant will be provided below.

Figure 3:
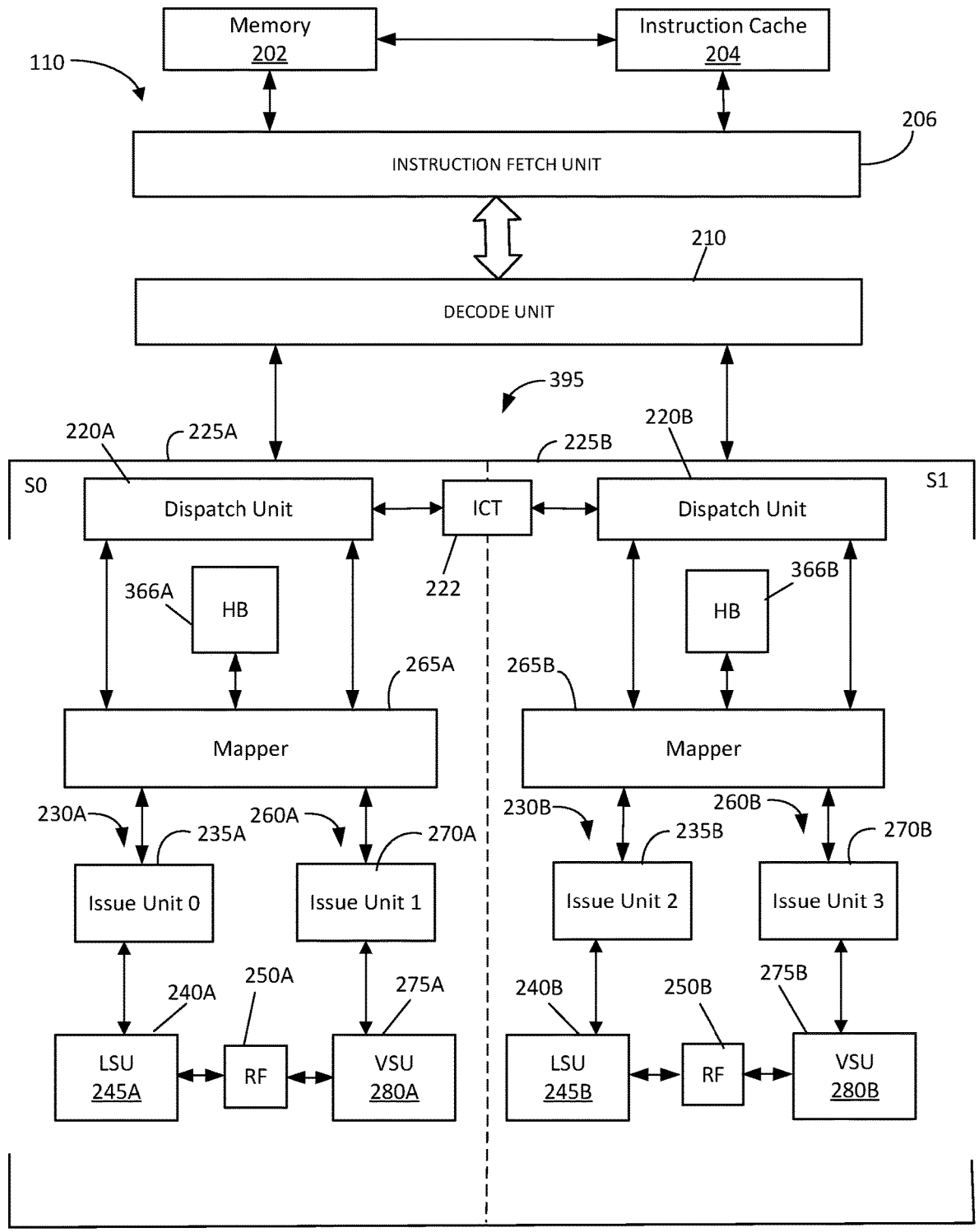
FIG. 3 illustrates a block diagram of a portion of a multi-slice processor having two execution slices (e.g., one SuperSlice) in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of explanation. It will be appreciated that the multi-slice processor may have other configurations. As shown in FIG. 3, the multi-slice processor 110 includes two processing slices-Slice 0 (slice S0 or 225A) and Slice 1 (slice S1 or 225B). The processor 110 also includes Memory 202, Instruction Cache 204, Instruction Fetch Unit 206, and Decode Unit 210. Each of the slices S0 and S1 includes an Instruction Dispatch Unit (220A and 220B); a Logical Register Mapper (265A and 265B); a History Buffer (HB) (366A and 366B); a first processing pipeline (230A and 230B); and a second processing pipeline (260A and 260B). The two processing slices 225A and 225B share an Instruction Completion Table (ICT) 222.

Each first processing pipeline (230A and 230B) includes a first Issue Unit (ISQ) (235A and 235B), and first Execution Units (240A and 240B), where each execution unit 240A, 240B in the respective first processing pipeline 230A, 230B can include multiple execution units, including a load store unit (LSU) execution unit (245A and 245B) as shown in the example of FIG. 3. First processing pipeline 230A, 230B can include other execution units, such as, for example, a SX/Agen, a floating-point execution unit (FPU), a fixed-point execution unit (FXU), etc. Each second processing pipeline (260A and 260B) can include a second Issue Unit (ISQ) (270A and 270B) and Execution Units (275A and 275B), where each execution unit 275A, 275B in the respective second processing pipeline 260A, 260B can include multiple execution units, including a vector scalar unit (VSU) execution unit (280A and 280B) as shown in the example of FIG. 3. Second processing pipeline 260A, 260B) can include other execution units, such as, for example, FX/ALU execution units, floating point execution units (FPU), etc.

A physical Register File (RF) 250A can be used by both first processing pipeline 230A and second processing pipeline 260A in SuperSlice 225A, while a physical Register File 250B can be used by both first processing pipeline 230B and second processing pipeline 260B in SuperSlice 225B. While processor 110 in FIG. 3 shows a single register file 250A, 250B shared between the first and second processing pipelines 230, 260, it can be appreciated that one or more register files 250 can be used in the first and second processing pipelines and across execution slices 225A and 225B. The Execution Units 240A, 240B, 275A, 275B can include one or more queues to hold instructions for execution by the Execution Units. It can be appreciated that the physical register files 250A, 250B contain a plurality of entries, and the physical register files 250A, 250B can be subdivided into blocks of entries, where in an aspect each block of entries receives (contains one or more write ports to receive) data from a specific execution unit, more specifically a specific execution unit such as for example LSU 245, VSU 280.

The Instruction Fetch Unit 206 fetches instructions to be executed by the processor 110. Instructions that are fetched by the Instruction Fetch Unit 206 are sent to the Decode Unit 210 where the instructions are decoded by instruction type. The Decode Unit 210 transmits the decoded instructions to respective Instruction Dispatch Unit 220A, 220B. The Instruction Dispatch Units 220A, 220B dispatch instructions to first respective Issue Unit 235 or second respective Issue Unit 270 depending upon the type of instruction and which execution units 240 or 275 should process that particular instruction. The Instruction Dispatch Units 220A, 220B dispatch the instructions to the respective first Issue Unit 235 or second Issue Unit 270 typically in program order. In one or more embodiments, each instruction dispatched to the first Issue Unit 235 or second Issue Unit 270 is stamped with an identifier, e.g., identification tag (iTag), to identify the instruction. The instructions can be stamped with other information and metadata. The instructions (iTags) typically are allocated (assigned) and stamped in ascending program order on a per thread basis.

The respective first Issue Unit 235 or second Issue Unit 270 will issue instructions to the respective execution units 240 or execution units 275 based upon the instruction type. For example, multi-cycle arithmetic instructions are typically handled by the second processing pipeline 260 (for example by VSU execution unit 285), while store instructions, load instructions, branch and store instructions are typically handled in the first processing pipeline 230 (for example in the LSU unit 245). The first and second Issue Units 235, 270 typically hold an instruction until data associated with the instruction has been retrieved and ready for use. In certain aspects, the respective first Issue unit 235 and second Issue Unit 270 holds a set of instructions while the physical register file 250 accumulates data for the instruction inputs. A register file may be used for staging data between memory and other functional (execution) units in the processor. There may be numerous register files and types. When all source data accumulates for the instruction, the data in one or more embodiments is passed on to one or more execution units 240, 275 designated to execute the instruction. A physical register (or main register) file 250 may serve to store data to be used in an operation specified in an instruction dispatched to Execution Units 240, 275, and the result of the operation performed by the Execution Units 240, 275 (e.g., LSUs 245 and VSUs 280) may be written to the designated target register entry in the physical register file 250. Each of the execution units, can make result data available on the write back buses for writing to a register file (STF) entry.

Logical register mapper 265 contains metadata (e.g., iTag, STFtag, etc.) which provides a mapping between entries in the logical register (e.g., GPR1) and entries in physical (main) register file 250 (e.g., physical register array entry). The STFtag is the pointer that correlates a logical register entry (LREG) to an entry in the physical register file 250. For example, when an instruction wants to read a logical register, e.g., GPR1, the logical register mapper 265 tells respective issue unit 235, 270, which tells respective execution unit 240, 275, e.g., LSU 245 and VSU 280 where in the physical register file 250 it can find the data, e.g., the physical register array entry. The respective Execution Unit 240, 275, e.g., LSU 245 or VSU 280, executes instructions out-of-order and when the respective Execution Unit 240, 275 finishes an instruction, the respective Execution Unit 240, 275 will send the finished instruction, e.g., iTag, to the ICT 222. The ICT 222 contains a queue of the instructions dispatched by the Dispatch Unit 220 and tracks the progress of the instructions as they are processed.

When a mispredicted branch instruction or other exception is detected, instructions and data subsequent to the mispredicted branch or exception are discarded, e.g., flushed from the various units of processor 110. A history buffer (HB) 366, e.g., Save & Restore Buffer (SRB) 366, contains both speculative and architected register states and backs up the logical register mapper 255 when a new instruction is dispatched. In this regard, the history buffer (HB) 366 stores information from the logical register mapper 265 when a new instruction evicts data from the logical register mapper 265 in case the new instruction is flushed and the old data needs to be recovered. The history buffer (HB) 366 keeps the stored information until the new instruction completes. History buffer (HB) 266 interfaces with the logical register mapper 265 in order to restore the contents of logical register mapper 265 from the history buffer (HB) 266 back to the logical register mapper 265, updating the pointers in the logical register mapper 265 so instructions know where to obtain the correct data, e.g., the processor is returned to the state that existed before the interruptible instruction, e.g., before the branch instruction was mispredicted. Not shown in FIG. 3 are control registers, control register mappers, and/or control register history buffers.

CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4), for example, are simultaneously processed.

Disclosed is a system, tool, programming, and/or technique that permits a conditional branch instruction sequence, e.g., a load=>compare immediate=>conditional branch instruction sequence, to execute quicker, and in an embodiment without waiting for the compare immediate instruction to execute. In an approach the conditional branch instruction will infer the value that the compare immediate instruction will produce. That is, in an embodiment the conditional branch instruction will infer the branch prediction value from the branch predictor that is used to predict the conditional branch. With the inferred value for the conditional branch instruction (predicted by the branch predictor and generally held or represented in a control register, e.g., CR0), the conditional branch instruction and/or the compare immediate instruction can auto-finish (e.g., a zero cycle move) at dispatch time from the dispatch unit without undergoing execution.

When the load instruction is executed and its data is written back, e.g., issued from the issue queue, executed by the Load Store Unit (LSU) and written back to a target register file (STF), the correct branch prediction value can be computed (generated) and then compared to the previously inferred compare result value (e.g., the inferred CR0 predicted by the branch predictor and retained in the control register, e.g., CR0). If the computed compare result value (computed CR0) is the same as the inferred compare result value (inferred CR0) originally predicted by the branch predictor, then the code stream can continue as normal. However, if the computed compare result value (computed CR0) is not the same as the inferred compare result (inferred CR0), then a flush will be initiated, preferably at the conditional branch ITAG+1 (e.g., the next instruction after the conditional branch instruction), to refetch the instructions after (following) the conditional branch instruction. By having the compare immediate instruction and the conditional branch instruction auto-finish, in an embodiment by a zero-cycle move, the conditional branch instruction can be resolved speculatively much earlier than if it was executed and thereby potentially increase performance of the processor. That is the conditional branch instruction is resolved speculatively using the branch prediction from the branch predictor, and after the load instruction is executed if the branch prediction was wrong the error is corrected.

Figure 4A:
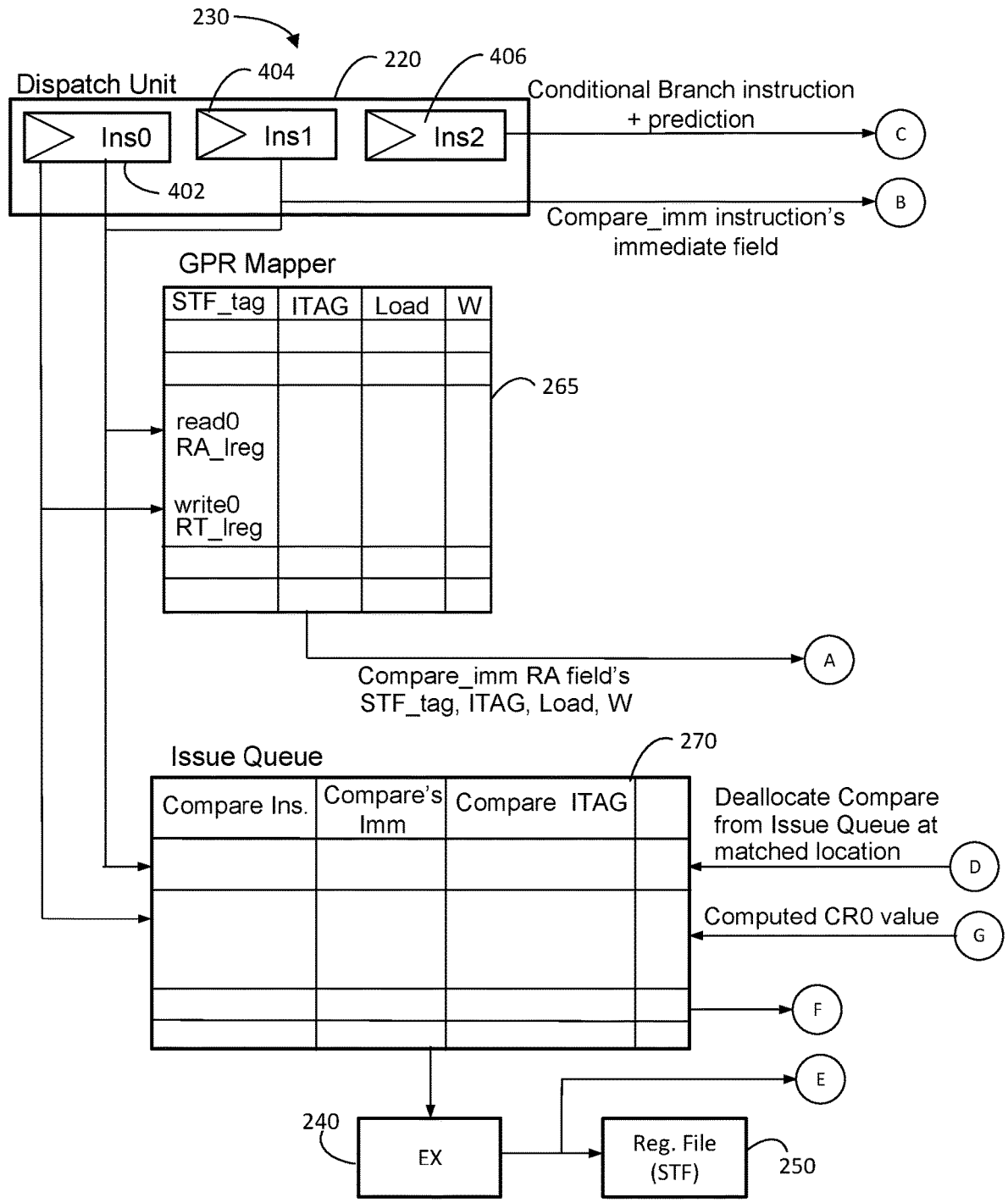
FIGS. 4A & 4B illustrates a block diagram of a more detailed view of a portion of a processor pipeline, including a Dispatch Unit, Logical Register Mapper, Compare Register, Issue Queue, Instruction Complete Table (ICT), execution unit and register (STF) file, according to an embodiment of the disclosure.
Figure 4B:
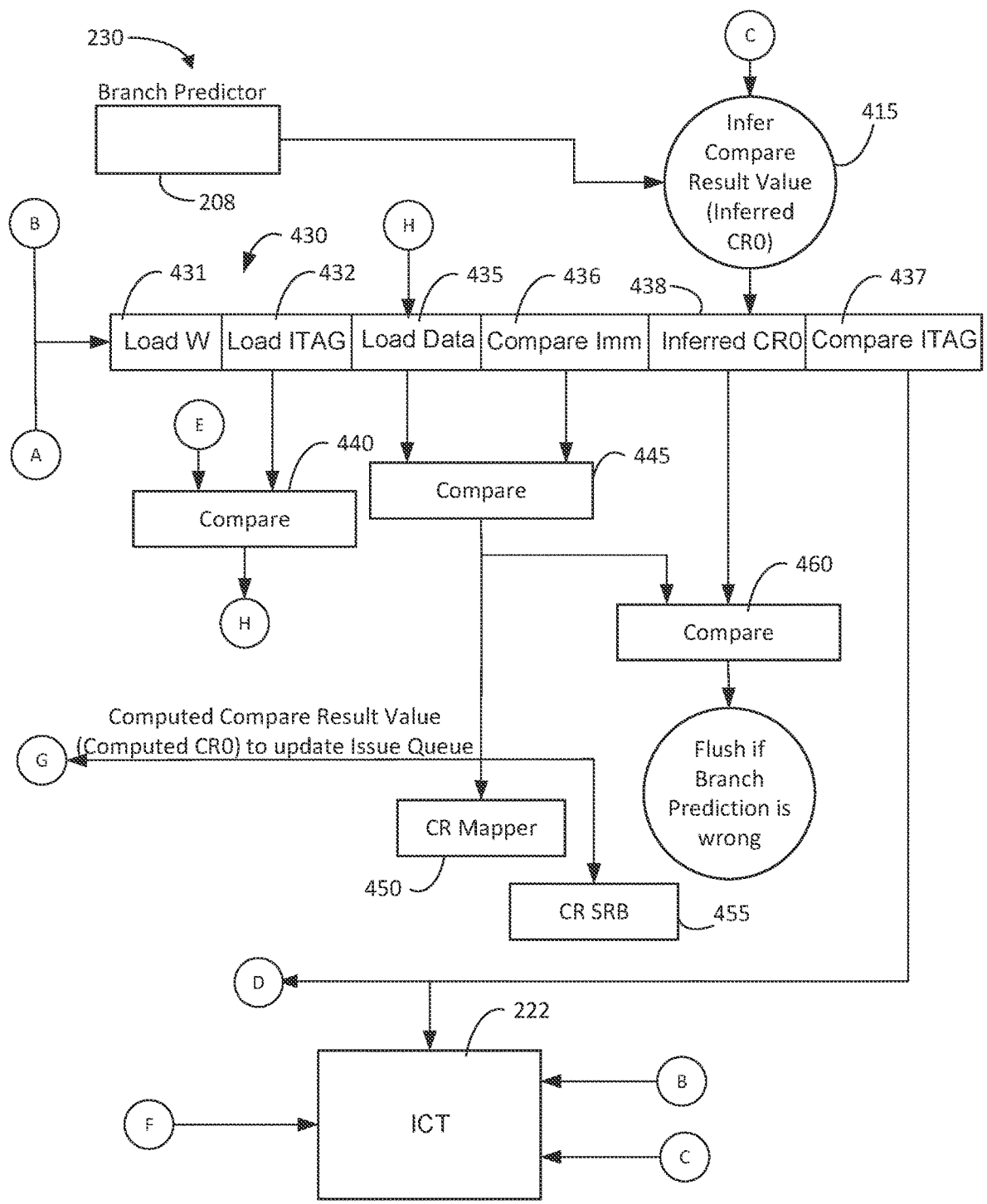

FIGS. 4A & 4B illustrate a portion of an example processor pipeline 230, including an illustrative Dispatch Unit 220, Logical (GPR) Mapper 265, Issue Queue 270, Execution Unit 240, Register (STF) File 250, Branch Predictor 208, Control Register 415 and Special Register 430. Processor pipeline 230 will be used to assist in explaining the operation of the system, mechanism, and/or technique to speculatively process a conditional branch instruction, e.g., a Load=>Compare Immediate=>Conditional Branch Instruction sequence, to permit the conditional branch instruction to be resolved potentially more quickly in a processor pipeline.

A conditional branch instruction, in particular a conditional branch instruction sequence including a load instruction (Ins0) 402, a compare immediate instruction (Ins1) 404, and a conditional branch instruction (Ins2) 406, are illustrated in Dispatch Unit 220. In can be appreciated that the conditional branch instruction sequence can include other instruction sequences, such as, for example, an add instruction-compare immediate instruction-conditional branch sequence. It can also be appreciated that the instructions in the instruction sequence do not have to be dispatched and/or issued without intervening instructions. In other words, instructions 402, 404, and 406 do not have to be dispatched and/or issued consecutively.

In an embodiment, the Dispatch Unit 220 assigns an ITAG to the load instruction (Ins0) 402 and the load instruction 402 is dispatched from the Dispatch Unit 220 where it is written into Logical Register Mapper 265 and written into the Issue Queue 270. More specifically the destination STF tag, the ITAG, the load bit, and the written (W) bit for the load instruction 402 are written into the Logical Register (GPR) Mapper 265. With or after the load instruction (Ins0) 402 is issued from the Dispatch Unit 220, the Dispatch Unit 220 assigns an ITAG to the compare immediate instruction (Ins1) 404 and the compare instruction 404 is dispatched from the Dispatch Unit 220 where it is written into Logical Register Mapper 265 and the Issue Queue 270.

In response to the compare immediate (Ins1) 404 being dispatched from the Dispatch Unit 220, the Dispatch Unit 220 will read the STF tag, the ITAG, the load bit, and the written (W) bit for the load instruction 402. The Dispatch Unit 220 will check the load bit of the load instruction 402 and if the load bit is set (e.g., equal to 1) indicating that the load instruction 402 has not yet been executed (the load instruction 402 has not written back its data), then the information read by the Dispatch Unit 220, is written, preferably by the Dispatch Unit 220, into Special Register 430, also referred to as Compare_Imm_Info Register 430 or Compare Register 430, as shown by designator "A" in FIGS. 4A & 4B. More specifically, in an embodiment, if the load bit of the load instruction 402 is set, then the Dispatch Unit 220 writes the W bit of the load instruction 402 into field 431 and the ITAG of the load instruction 402 into field 432 of the Compare Register 430.

In addition to the information from the load instruction 402 in the Mapper 265 being written into the Compare Register 430, information from the compare immediate instruction 404 is written into the Compare Register 430. More specifically, in response to the load bit of the load instruction 402 being set (e.g., equal to 1), the compare immediate field of the compare immediate instruction 404 is written into field 436 of the Compare Register 430 and the ITAG of the compare immediate instruction 404 is written into field 437 in the Compare Register 430 as shown by designator "B" in FIGS. 4A & 4B. That is, in response to the load bit being set (e.g., equal to 1), the W bit and ITAG from the load instruction 402 and the immediate field and the ITAG from the compare immediate instruction 404 are written into the Compare Register 430. In an approach as shown in FIGS. 4A & 4B, Dispatch Unit 220 writes the information from the load instruction 402 and compare immediate instruction 404 into the Compare Register 430, and, in an example embodiment, the Dispatch Unit 220 reads the information on the load instruction 402 and compare immediate instruction 404 from the Logical Mapper 265 and writes the information into the Compare Register Mapper 430.

It can be appreciated that additional information can be written into the Compare Register 430, including additional information from the load instruction 402 and/or compare immediate instruction 404, and/or can be written by the Dispatch Unit 220 or other functional units in the processor, and/or the additional information can be read from the Logical Mapper 265 or other functional units in the processor. For example, the STF tag of the load instruction 402 and/or the STF tag of the compare immediate instruction 404 can be written into the Compare Register 430. If the load instruction 402 has already executed by the time the compare immediate instruction 404 is dispatched, indicated by the load bit of the load instruction 402 not being set (e.g., not set at 1), then the information from the load instruction 402 is not written into the Compare Register 430. That is the inferring system, technique and/or mechanism will not be activated for this conditional branch sequence, e.g., this load-compare immediate-conditional branch instruction sequence.

In response to a conditional branch instruction, e.g., conditional branch instruction (Ins2) 406, being decoded by Decode Unit 210 not shown in FIGS. 4A & 4B, a Branch Predictor Unit 208 predicts the outcome or result of the branch, e.g., whether the condition set by compare immediate instruction 404 (Ins1) will be satisfied. The branch prediction is used to infer the compare result value (inferred CR0) produced by the compare immediate instruction 404 (Ins1) and the inferred compare result (inferred CR0) is written into the Compare Register 430, and in an example embodiment of FIGS. 4A & 4B in entry CR0 in Control Register 415. In a more specific embodiment, the branch prediction unit 208 predicts the result of the compare immediate instruction, typically based upon branch history. The branch prediction computed by the branch predictor 208, which predicts the outcome of a condition retained in Control Register 415, e.g., in CR0, will be referred to as an inferred compare result value or inferred CR0. In an example embodiment, the value in CR0 in Control Register 415 can be represented as four bits representing less than (<), greater than (>), equal to (=), and overflow (ovfl). Other representations and values for the conditional branch prediction are contemplated and covered by the description herein. The branch predictor 208 and the conditional branch prediction values (e.g., the inferred CR0 value) are beyond the scope of this disclosure, and thus a multitude of branch predictors and the representation of their results are intended to be covered by this disclosure.

The Dispatch Unit 220 now determines that the conditional branch instruction 406 (Ins2) is being dispatched, assigns an ITAG to the conditional branch instruction (Ins2) 406 and dispatches the conditional branch instruction 406 from the Dispatch Unit 220. In response to the conditional branch instruction 406 being dispatched by the Dispatch Unit 220, it is determined whether the compare immediate instruction 404 (Ins 1) has executed, and if the compare immediate instruction 404 (Ins) has not executed, then the inferred compare result value (e.g., inferred CR0) will be written into the Compare Register 430 as shown by designator "C" in FIGS. 4A & 4B. That is, if a conditional branch instruction 406 is dispatched, then the inferred compare result value (inferred CR0 value in the Control Register 415) that indicates the direction the conditional branch instruction 406 is likely to go, will be used and/or inferred for the result of the branch instruction 406 and written into the Compare Register 430, more specifically into field 438 in the Compare Register 430. If the compare immediate instruction 404 has already executed, indicated by the W bit of the compare immediate instruction 404 (Ins1 in the logical Mapper 265), then the inferred compare result value (e.g., the inferred value in CR0 (inferred CRO) is not written into the Compare Register 430, e.g., not written into field 438 in the Compare Register 430), and the inferring system, technique and/or mechanism will not be activated for this conditional branch sequence, e.g., this load-compare immediate-conditional branch instruction sequence.

In response to the inferred compare result value (inferred CR0) being written into the Compare Register 430, more specifically into field 438 in the Compare Register 430, the Branch Prediction inferring system, mechanism, logic and/or technique is activated (e.g., the Conditional Branch instruction is speculatively resolved). In response to the branch prediction inferring system, mechanism, logic and/or technique being activated, the compare intermediate instruction 404 will be deallocated from the Issue Queue 270 (so that it will not be issued from the Issue Queue and executed by an Execution Unit 240). More specifically, the ITAG and information from the compare immediate instruction 404 will be sent to the Issue Queue 270 as shown by designator "D" in FIGS. 4A & 4B to deallocate the compare immediate instruction 404 in the Issue Queue 270. In addition, the compare immediate instruction 404 and the conditional branch instruction 406 will auto-finish without being executed in the processor (e.g., not be issued from the Issue Queue 270 to an Execution Unit 240 for execution). That is, the conditional branch instruction ITAG and the compare immediate ITAG will be sent to the ICT 222 to auto-finish (e.g., marked as finished in the ICT 222). In an embodiment the conditional branch instruction ITAG is sent from the Dispatch Unit 220 to the ICT 222 as shown by designator "C" in FIGS. 4A & 4B, and in a further embodiment the compare immediate instruction ITAG is sent from field 437 of the Compare Register 430 to the ICT 222. The conditional Branch instruction 406 is not written into the Issue Queue 270. Additionally, if the compare immediate instruction 404 and the conditional branch instruction 406 are dispatched from the Dispatch Unit 220 in the same cycle, then the compare immediate instruction 404 will not be written into the Issue Queue 270 and will also auto-finish (e.g., be sent to the ICT 222 and marked as finished).

In response to the load instruction 402 in the Issue Queue 270 being issued to an Execution Unit 240, e.g., an LSU Unit 270, and being executed in the execution unit 240, the write-back ITAG for the load instruction will be sent to comparator 440 as shown by designator "E" in FIGS. 4A & 4B where the write-back ITAG will be compared at 440 to the load ITAG of the load instruction 404 from field 432 of the Compare Register 430 (previously written/stored in Compare Register 430). If the ITAG compare at 440 is a match, indicating that the write back was for the same load instruction 404 written into the Compare Register 430, then the load instruction write-back data as shown by designator "H" in FIGS. 4A & 4B is written into field 435 of Compare Register 430. In response to the Load Data being available in the Compare Register 430, i.e., in field 435 of Compare Register 430, the load data from field 435 can be compared at 445 to compare immediate field 436 from the Compare Register 430 to generate a computed compare result value (e.g., a computed CR0 value). The computed compare result value (computed CR0) will then be updated in the Control Register (CR) Mapper 450 (for the dependent instruction in Control Register History Buffer 455) and its dependent instruction in the Issue Queue 270 as shown by designator "G" in FIGS. 4A & 4B.

The computed compare result value (computed CR0) will be compared at 460 to the inferred compare result value (inferred CR0) stored in the Compare Register 430, more specifically stored in field 438 of the Compare Register 430, and if the compare at 460 is a match (e.g., the computed compare result value (computed CR0) is equal to the inferred compare result value (inferred CR0), then no further action is required and the conditional branch instruction has been successfully resolved. On the other hand, if the computed correct branch prediction value (computed correct CR0)) is not the same as the inferred branch prediction value (CR0) as determined at 460, in other words the branch prediction was incorrect, then typically a flush will be generated to flush out the incorrect instruction stream processing, and in an embodiment a flush from the next instruction following the conditional branch instruction (e.g., flush at instruction Branch ITAG+1) will be generated.

It can be appreciated that while the Compare Register 430 in FIGS. 4A & 4B shows one entry, the Compare Register 430 can have one or more entries, including numerous entries depending upon the processor architecture. It can further be appreciated that more or less information (e.g., fields) may be included in the Compare Register 430, and that while in the example of FIGS. 4A & 4B the branch prediction is saved as a value in CR0 of control register 415, the branch prediction can be obtained and/or saved in different entries and in locations other than control register 415. The branch prediction can be represented in manners other than as illustrated in FIGS. 4A & 4B.

Figure 5A:
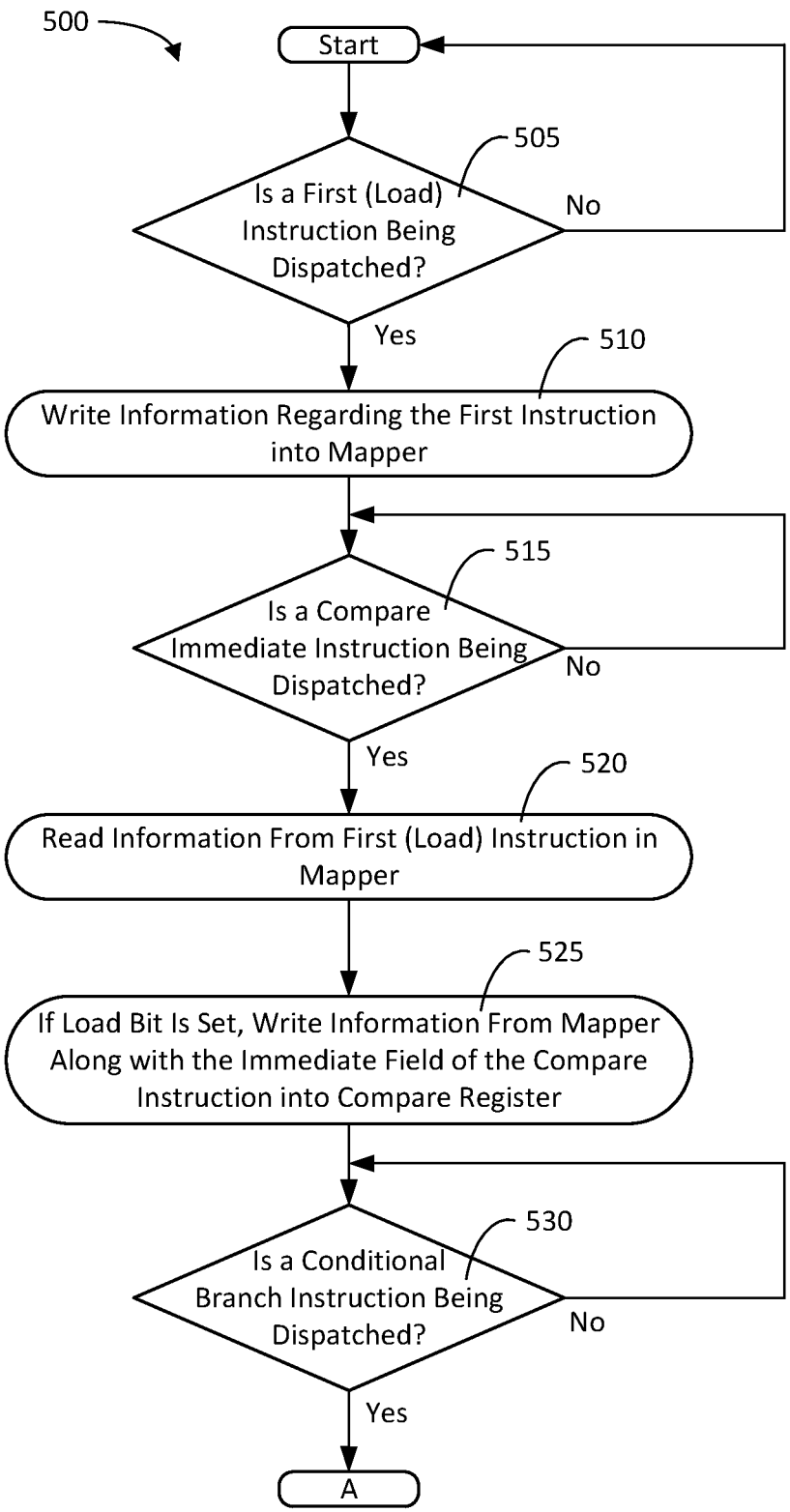
FIGS. 5A, 5B & 5C illustrates a flow chart of a method of processing a conditional Branch instruction sequence, and in an example a Load-Compare Intermediate-Conditional Branch instruction sequence in accordance with an embodiment of the disclosure.
Figure 5B:
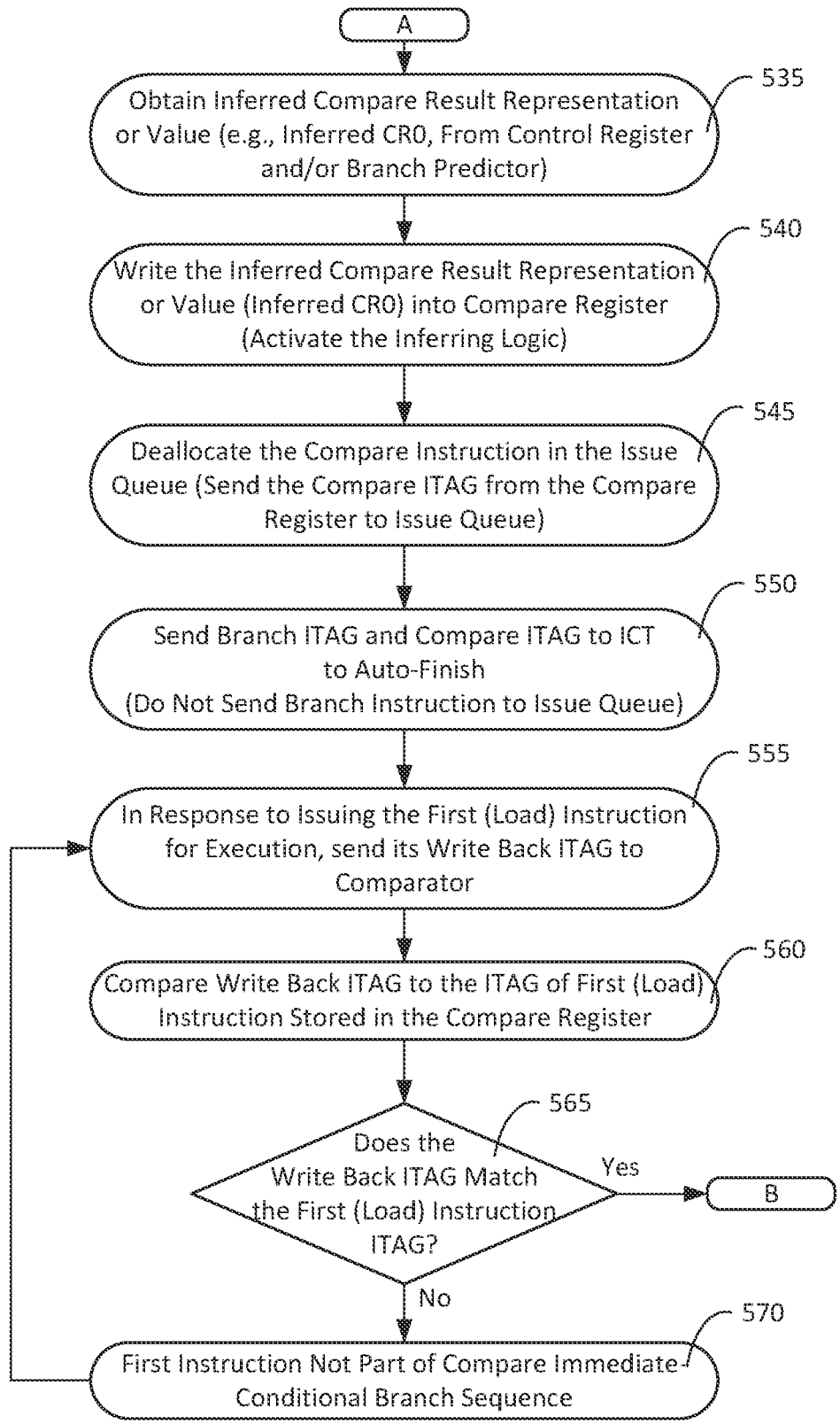
Figure 5C:
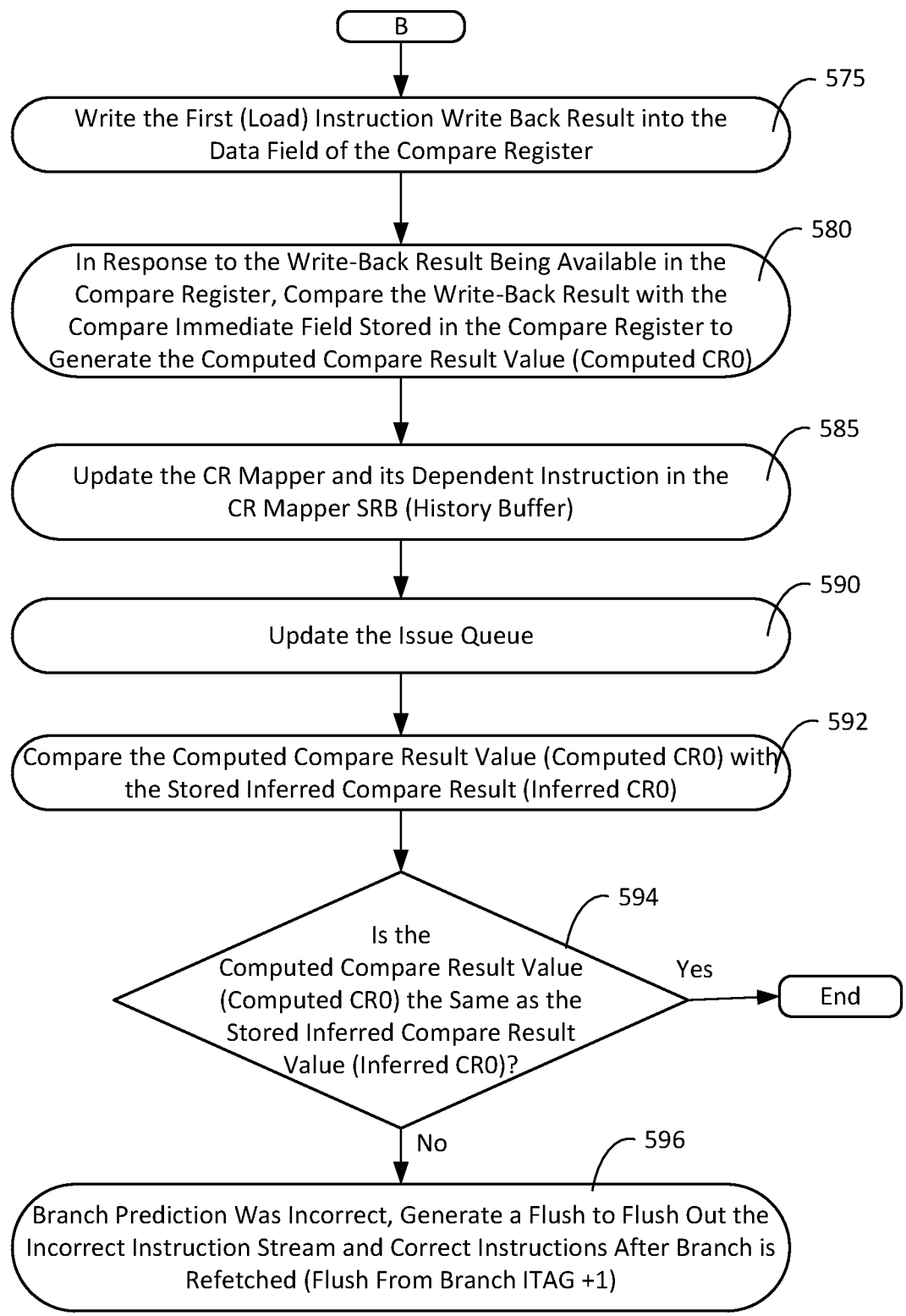

FIGS. 5A-5C illustrate an exemplary overview flowchart in accordance with an embodiment illustrating and describing a method 500 of speculatively handling a conditional branch instruction, e.g., a Load-Compare Immediate-Conditional Branch instruction sequence, in a processor. While the method 500 is described for the sake of convenience and not with an intent of limiting the disclosure as comprising a series and/or a number of steps, it is to be understood that the process 500 does not need to be performed as a series of steps and/or the steps do not need to be performed in the order shown and described with respect to FIGS. 5A-5C, but the process 500 may be integrated and/or one or more steps may be performed together, simultaneously, or the steps may be performed in the order disclosed or in an alternate order.

The method 500 in FIGS. 5A-5C at 505 determines if a first instruction in a sequence, e.g., a load instruction, is being dispatched, for example by the Dispatch Unit. If a first instruction in a sequence (e.g., load instruction 402) is not being dispatched (505: No), then the process 500 continues to monitor for a first (e.g., load) instruction in a sequence. If a first instruction in a sequence (e.g., load instruction 402) is dispatched (505: Yes), then process 500 continues to 510. At 510, in response to a first instruction in a sequence, e.g., a load instruction, being dispatched, information on the first instruction is written into a Mapper (e.g., Logical (GPR) Mapper 265) and in an embodiment into an Issue Queue (e.g., Issue Queue 270). The information written into the Mapper (e.g., Logical GPR Mapper 265) in an approach includes the first instruction's destination STF tag, the first instruction ITAG, the first instruction load bit, and the first instruction written (W) bit. It is contemplated that in an aspect additional information is written into the Mapper.

Process 500 continues to 515 where it is determined if a compare immediate instruction, e.g., compare immediate instruction 404, is being dispatched, for example by the Dispatch Unit. If a compare immediate instruction (e.g., compare immediate instruction 404) is not being dispatched (515: No), then the process 500 waits for the next instruction to determine whether a compare immediate instruction is dispatched. Process 500 continues at 515 waiting for a compare immediate instruction to be dispatched. If a compare immediate instruction (e.g., compare immediate instruction 404) is dispatched (515: Yes), then process 500 continues to 520. At 520, in response to a compare immediate instruction being dispatched (515: Yes), then information on the first instruction (e.g., the load instruction 402) is read from the Mapper (e.g., Logical Mapper 265). Process continues to 525 where a load bit is checked and if the load bit is set information from the first instruction (e.g., load instruction 402) is placed in a Compare Register (e.g., Compare Register 430), and in an embodiment information on the first instruction is read from the Mapper (e.g., the Logical GPR Mapper 265) and written to the Compare Register (e.g., Compare Register 430). In an embodiment, at 525 the ITAG, the Load bit, the written (W) bit, and the STF tag of the first instruction is written by the Dispatch Unit into the Compare Register, and in an aspect is read from the Mapper by the Dispatch Unit and written into the Compare Register. If the load bit is set, then at 525 the immediate field of the compare immediate instruction (e.g., the compare immediate instruction 404) is also written into the Compare Register.

At 530 it is determined whether a conditional branch instruction is being dispatched, for example by the Dispatch Unit. If a conditional branch instruction (e.g., conditional branch instruction 406) is not being dispatched (505: No), then the process 500 continues to monitor for a conditional branch instruction. If a conditional branch instruction is dispatched (530: Yes), then process continues to 535 where the branch prediction for the conditional branch instruction, e.g., the branch prediction value or representation as stored in CR0, is obtained, computed, and/or inferred (e.g., by logic) and at 540 is written into the Compare Register. That is the inferred compare result value (inferred CR0), for example the value or representation in CR0 in the control register 415, will be written into the Compare Register (e.g., Compare Register 430). In an approach, by writing the branch prediction, e.g., the inferred compare result value (inferred CR0) as stored or represented in CR0, into the Compare Register the inferring logic is activated. If the compare immediate instruction has already executed and written its data back, then the branch prediction, e.g., the branch prediction value from CR0, is not written into Compare Register and the inferring logic is not activated.

Process 500 continues to 545 where the compare immediate instruction in the Issue Queue is deallocated. In an approach, the compare ITAG in the Compare Register is sent to and/or received by the Issue Queue to deallocate the compare instruction. The Issue Queue in an embodiment is searched for an ITAG that matches the compare ITAG sent to the Issue Queue from the Compare Register, and if there is a matching ITAG in the Issue Queue, the entry in the Issue Queue with the matching ITAG is deallocated. At 550, conditional branch instruction ITAG (e.g., the branch ITAG) and the compare immediate instruction ITAG (e.g., the Compare ITAG) are sent to and/or received by the ICT (e.g., ICT 222) to auto-finish. That is, the compare immediate instruction and the conditional branch instruction are marked as finished in the ICT. In this regard, the conditional branch instruction (e.g., conditional branch instruction 406) is not dispatched to the Issue Queue. In an approach, if the compare immediate instruction and the conditional branch instruction are dispatched in the same cycle, then the compare immediate instruction will not be written into the Issue Queue, but the compare instruction will auto-finish as will the conditional branch instruction.

Process 500 continues to 555 where in response to issuing the first instruction (e.g., load instruction 402) for execution, the first instruction's write-back ITAG is sent to a comparator where at 560 it (the write back ITAG) is compared to the Load ITAG stored in the Compare Register (e.g., Compare Register 430). At 565 it is determined whether the write back ITAG matches the ITAG of the first instruction stored in the Compare Register. If the write-back ITAG does not match the ITAG of the first instruction (565: No), then the process continues to 570 as the first instruction is not part of the conditional branch sequence undergoing the speculatively inferred conditional branch prediction processing system, mechanism and/or technique, and process 500 continues back to for example 555 where in response to issuing another instruction, it's write-back ITAG is sent to the comparator.

If the write-back ITAG matches the Load ITAG (565: Yes), then the process 500 continues to 575 where the load write back result is written into the load data field of the Compare Register. In response to the load data being available in the Compare Register, at 580 the load data is compared to the compare immediate field stored in the Compare Register to generate the correct computed branch prediction, e.g., generate the correct computed branch prediction value (the correct computed compare result value (computed CR0)). At 585 the CR Mapper (e.g., Mapper 450) and the CR History Buffer (e.g., CR SRB 455) will be updated, and in an embodiment is updated to indicate data has been written. At 590 the Issue Queue is updated, and in an embodiment to indicate that data has been written.

At 592 the computed compare result value (computed CR0) is compared with the stored inferred compare result value (inferred CR0). That is, in an approach, the computed compare result value (computed CR0) generated by comparing the load data with the compare immediate field stored in the Compare Register is compared to the inferred compare result value (inferred CR0) stored in the Compare Register. At 594 it is determined whether the computed compare result value (computed CR0) is the same as the inferred compare result value (inferred CR0). If the computed compare result value (computed (CR0) is the same as the inferred compare result value (inferred CR0) (594: Yes), then the process 500 is complete. If, however, the computed compare result value (computed CR0) is not the same as the inferred compare result value (computed CR0) (594: No), then the branch prediction was incorrect and at 596 a flush is generated to flush out the incorrect instruction stream. In an approach the flush is from the next instruction after the conditional branch (flush is from branch ITAG+1) and the correct instructions after the branch are re-fetched.

While the illustrative embodiments described above are preferably implemented in hardware, such as in units and circuitry of a processor, various aspects of the illustrative embodiments may be implemented in software as well. For example, it will be understood that each block of the flowchart illustrated in FIGS. 5A-5C, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations in FIGS. 5A-5C support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for processing instructions in a processor, the method comprising:
   storing, in response to a load bit of a first instruction of a compare immediate-conditional branch instruction sequence being set, information from the first instruction into a compare register, including an ITAG of the first instruction;
   writing, in response to the load bit of the first instruction being set, an immediate field of a compare immediate instruction of the compare immediate-conditional branch instruction sequence into the compare register;
   writing, in response to detecting a conditional branch instruction of the compare immediate-conditional branch instruction sequence, an inferred compare result value into the compare register;
   auto-finishing the compare immediate and the conditional branch instructions from the compare immediate-conditional branch instruction sequence without executing the compare immediate and the conditional branch instruction in an execution unit;
   comparing, in response to executing the first instruction, a writeback ITAG of the first instruction to the ITAG of the first instruction stored in the compare register;
   writing, in response to the writeback ITAG of the first instruction matching the ITAG of the first instruction stored in the compare register, a first instruction writeback result into a data field in the compare register;
   comparing, in response to the first instruction writeback result being written into the data field in the compare register, the first instruction writeback result written into the data field in the compare register with the immediate field of the compare immediate instruction written into the compare register to generate a computed compare result value;
   comparing the computed compare result value to the inferred compare result value;
   flushing, in response to the computed compare result value not matching the inferred compare result value, instructions in the processor; and
   not flushing, in response to the computed compare result value matching the inferred compare result value, instructions in the processor.

2. The method according to claim 1, further comprising writing information regarding the first instruction into a Mapper and an Issue Queue.

3. The method according to claim 2, further comprising:
   reading, in response to detecting the compare immediate instruction of the compare immediate-conditional branch instruction sequence, information from the first instruction in the Mapper; and
   writing the information read from the first instruction in the Mapper into the compare register.

4. The method according to claim 1, wherein the information from the first instruction written into the compare register comprises the ITAG of the first instruction, the load bit of the first instruction, and a written bit of the first instruction.

5. The method according to claim 1, wherein information from the first instruction is not written into the compare register if the first instruction has executed and written its result before the compare immediate instruction is dispatched to an Issue Queue.

6. The method according to claim 1, wherein the first instruction is at least one of a group consisting of a load instruction and an add instruction.

7. The method according to claim 1, wherein the inferred compare result value is obtained from an entry in a control register.

8. The method according to claim 1, further comprising deallocating the compare immediate instruction from an Issue Queue.

9. The method according to claim 1, wherein a compare immediate instruction ITAG and a conditional branch ITAG are sent to an Instruction Complete Table to be marked finished.

10. The method according to claim 9, further comprising writing the compare immediate instruction ITAG into the compare register, and obtaining the compare immediate instruction ITAG sent to the Instruction Complete Table from the compare register.

11. The method according to claim 1, further comprising sending, in response to the first instruction issuing for execution, the first instruction writeback ITAG and the first instruction ITAG to a comparator and comparing the writeback ITAG and the first instruction ITAG.

12. The method according to claim 1, further comprising updating, in response to the writeback result of the first instruction being available in the compare register, a control register mapper and an Issue Queue.

13. The method according to claim 1, wherein the inferred compare result value is based at least in part on at least one of a group consisting of: a branch prediction determined by a branch predictor, a representation of a branch prediction determined by a branch predictor, and combinations thereof.

14. A method for processing instructions in a processor, the method comprising:
   writing information from a first instruction of a compare immediate-conditional branch instruction sequence into an entry of a compare register;
   writing, in response to the first instruction not being executed before a compare immediate instruction of the compare immediate-conditional branch instruction sequence is dispatched, a compare immediate field of the compare immediate instruction into the entry of the compare register;
   writing, in response to dispatching a conditional branch instruction of the compare immediate-conditional branch instruction sequence, an inferred compare result value into the entry in the compare register;

writing a writeback result of the first instruction into a data field in the entry in the compare register without executing the compare immediate instruction or the conditional branch instruction of the compare immediate-conditional branch instruction sequence;

comparing the writeback result of the first instruction written into the data field in the entry in the compare register to the immediate field of the compare immediate instruction written into the entry in the compare register to generate a computed compare result value; and comparing the computed compare result value to the inferred compare result value stored in the entry in the compare register;

flushing, in response to the computed compare result value not matching the inferred compare result value, instructions in the processor.

15. The method according to claim 14, wherein the first instruction is a load instruction, and the method further comprises:

writing the information from the first instruction into a first entry in an Issue Queue;

writing information from the compare immediate instruction into a second entry in the Issue Queue; and deallocating, in response to writing the inferred compare result value into the entry in the compare register, the second entry in the Issue Queue containing the information from the compare immediate instruction.

16. The method according to claim 14, further comprising auto-finishing the compare immediate and the condition branch instruction of the compare immediate-conditional branch instruction sequence without executing the compare immediate and the conditional branch instruction in an execution unit.

17. A processor for processing instructions, the processor comprising:

an instruction dispatch unit configured to dispatch instructions of a compare immediate-conditional branch instruction sequence, the compare immediate-conditional branch instruction sequence comprising a first instruction, a compare immediate instruction, and a conditional branch instruction;

a logical register mapper having a plurality of entries, each logical register mapper entry configured to map a logical register to a physical register entry in a physical register file;

an issue queue to hold the instructions dispatched from the instruction dispatch unit;

an execution unit to execute the instructions issued by the issue queue; and a compare register having at least one entry to hold information in a plurality of fields, wherein the processor is configured to:

write information from the first instruction of the compare immediate-conditional branch instruction sequence into one or more of the plurality of fields in the at least one entry in the compare register;

write, in response to the first instruction not being executed in the execution unit before the compare immediate instruction of the compare immediate-conditional branch instruction sequence is dispatched from the instruction dispatch unit, an immediate field and an ITAG of the compare immediate instruction into the at least one entry in the compare register;

write, in response to dispatching the conditional branch instruction of the compare immediate-conditional branch instruction sequence from the instruction dispatch unit, an inferred compare result value into the at least one entry in the compare register;

write, in response to executing the first instruction in the execution unit, a writeback result of the first instruction into a data field in the at least one entry in the compare register without executing in the execution unit the compare immediate instruction or the conditional branch instruction of the compare immediate-conditional branch instruction sequence;

compare the writeback result of the first instruction written into the data field in the at least one entry in the compare register to the immediate field of the compare immediate instruction written into the at least one entry in the compare register to generate a computed compare result value;

compare the computed compare result value to the inferred compare result value stored in the at least one entry in the compare register;

flush, in response to the computed compare result value not matching the inferred compare result value, instructions in the processor.

18. The processor according to claim 17, wherein the processor is further configured to:

write, in response to dispatching the first instruction from the instruction dispatch unit, information from the first instruction into a first entry in the issue queue; and write, in response to dispatching the compare immediate instruction from the dispatch unit, information from the compare immediate instruction into a second entry in the issue queue; and deallocate, in response to the inferred compare result value being written into the at least one entry in the compare register, the second entry in the issue queue containing the information from the compare immediate instruction.

19. The processor according to claim 17, wherein the processor is further configured to auto-finish the compare immediate and conditional branch instructions of the compare immediate-conditional branch instruction sequence without executing the compare immediate and the conditional branch instruction in an execution unit.

20. The processor according to claim 17, wherein the processor is further configured to:

compare, in response to the first instruction executing, a writeback ITAG of the first instruction to the ITAG of the first instruction stored in the at least one entry in the compare register; and write, in response to the writeback ITAG of the first instruction matching the ITAG of the first instruction stored in the at least one entry in the compare register, a first instruction writeback result into the data field in the at least one entry in the compare register.

* * * * *